(12) United States Patent
Oliver

(10) Patent No.: US 11,827,446 B2
(45) Date of Patent: Nov. 28, 2023

(54) CAPSULE, SYSTEM AND METHOD FOR PREPARING A BEVERAGE

(71) Applicant: Koninklijke Douwe Egberts B.V., Utrecht (NL)

(72) Inventor: Glen Andrew Oliver, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 898 days.

(21) Appl. No.: 15/963,258

(22) Filed: Apr. 26, 2018

(65) Prior Publication Data

US 2018/0257856 A1 Sep. 13, 2018

Related U.S. Application Data

(63) Continuation of application No. PCT/NL2016/050749, filed on Oct. 27, 2016.

(30) Foreign Application Priority Data

Oct. 27, 2015 (WO) ................ PCT/NL2015/000036
Oct. 28, 2015 (WO) ................ PCT/NL2015/050752

(51) Int. Cl.
*B65D 85/804* (2006.01)
*A23F 5/26* (2006.01)
*A47J 31/40* (2006.01)

(52) U.S. Cl.
CPC .......... *B65D 85/8061* (2020.05); *A23F 5/262* (2013.01); *A47J 31/407* (2013.01)

(58) Field of Classification Search
CPC .................................................. B65D 85/8043
See application file for complete search history.

(56) References Cited

U.S. PATENT DOCUMENTS 4,860,645 A * 8/1989 van der Lijn ...... B65D 85/8043
99/295
2003/0172813 A1 9/2003 Schifferle
(Continued)

FOREIGN PATENT DOCUMENTS

AU 2015255218 A1 11/2015
AU 2016253679 A1 11/2016
(Continued)

OTHER PUBLICATIONS

U.S. Appl. No. 15/811,524, filed Nov. 13, 2017.
(Continued)

*Primary Examiner* — Viren A Thakur
*Assistant Examiner* — Chaim A Smith
(74) *Attorney, Agent, or Firm* — FITCH, EVEN, TABIN & FLANNERY, LLP

(57) ABSTRACT

In a capsule containing a substance constituted by a mass of loose, solid particles, for the preparation of a potable beverage by extracting and/or dissolving the substance by means of supplying a fluid under pressure into the capsule, a screen, permeable to water and impermeable to a predominant portion of particles of the substance is positioned between the substance and the bottom. The screen is attached to the capsule body along attachment zones spaced from the center and circumferentially spaced from each other. A beverage brewing system comprising such a capsule, a method of use of such a capsule and a method of attaching a screen into a capsule body are described as well.

23 Claims, 4 Drawing Sheets

(56) References Cited

U.S. PATENT DOCUMENTS

| | | | |
|---|---|---|---|
| 2006/0219098 A1* | 10/2006 | Mandralis | B65D 85/8043 99/279 |
| 2006/0236871 A1* | 10/2006 | Ternite | B65D 85/8043 99/295 |
| 2009/0017177 A1 | 1/2009 | Yoakim et al. | |
| 2009/0320692 A1 | 12/2009 | Simanski | |
| 2010/0015307 A1 | 1/2010 | Abegglen et al. | |
| 2011/0064852 A1 | 3/2011 | Mann | |
| 2011/0185910 A1 | 8/2011 | Ryser | |
| 2012/0070551 A1* | 3/2012 | Mahlich | B65D 85/8043 426/433 |
| 2013/0099597 A1 | 4/2013 | Perentes et al. | |
| 2013/0180408 A1 | 7/2013 | Eichler et al. | |
| 2014/0170271 A1 | 6/2014 | Zweed et al. | |
| 2014/0178537 A1 | 6/2014 | Zweed et al. | |
| 2015/0314954 A1* | 11/2015 | Empl | B65D 85/8043 426/115 |
| 2016/0083174 A1* | 3/2016 | Halliday | B65D 85/8043 426/115 |
| 2016/0311608 A1* | 10/2016 | Accursi | A47J 31/0673 |

FOREIGN PATENT DOCUMENTS

| | | |
|---|---|---|
| AU | 2017219060 A1 | 9/2017 |
| CA | 2901582 A1 | 11/2014 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| EP | 0224297 | 6/1987 |
| EP | 0 468 079 | 1/1992 |
| EP | 0 844 195 B1 | 5/1998 |
| EP | 1 165 398 B1 | 12/2002 |
| EP | 1 190 959 B1 | 3/2004 |
| EP | 1 654 966 B1 | 5/2006 |
| EP | 1 700 548 | 9/2006 |
| EP | 1 700 584 A1 | 9/2006 |
| EP | 1 299 022 B1 | 2/2007 |
| EP | 1 339 305 B1 | 4/2007 |
| EP | 1 646 305 B1 | 9/2007 |
| EP | 1 849 715 B1 | 10/2007 |
| EP | 1 882 431 B1 | 1/2008 |
| EP | 1 892 199 A1 | 2/2008 |
| EP | 1 839 543 B1 | 6/2008 |
| EP | 1 859 712 B1 | 1/2009 |
| EP | 1 859 714 B1 | 2/2009 |
| EP | 2 070 828 B1 | 6/2009 |
| EP | 1 816 934 B1 | 11/2009 |
| EP | 1 967 099 B1 | 1/2010 |
| EP | 1 900 653 B1 | 3/2010 |
| EP | 2 029 457 B1 | 3/2010 |
| EP | 1 882 432 B1 | 7/2010 |
| EP | 2210827 | 7/2010 |
| EP | 2 230 195 A1 | 9/2010 |
| EP | 2 142 054 B1 | 1/2011 |
| EP | 2 068 684 B1 | 2/2011 |
| EP | 2 205 133 B1 | 6/2011 |
| EP | 2 284 100 B1 | 6/2011 |
| EP | 2 284 101 B1 | 9/2011 |
| EP | 2 364 930 A2 | 9/2011 |
| EP | 2 151 313 B1 | 10/2011 |
| EP | 2 229 082 B1 | 12/2011 |
| EP | 2 012 994 B1 | 7/2012 |
| EP | 2 385 922 B1 | 8/2012 |
| EP | 2 489 609 A1 | 8/2012 |
| EP | 2 374 383 B1 | 11/2012 |
| EP | 2 573 008 A1 | 3/2013 |
| EP | 2 631 198 A1 | 8/2013 |
| EP | 2 631 199 A1 | 8/2013 |
| EP | 2 512 302 B1 | 9/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 516 296 A1 | 8/2014 |
| EP | 2 801 538 A1 | 11/2014 |
| EP | 2 334 564 B1 | 3/2015 |
| EP | 2 868 598 A1 | 5/2015 |
| EP | 3 023 360 B1 | 1/2018 |
| ES | 1137034 U | 3/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2 503 774 B | 6/2015 |
| GB | 2 523 775 A | 9/2015 |
| WO | 0226588 | 4/2002 |
| WO | WO-2006/045536 A1 | 5/2006 |
| WO | WO-2007/122206 A1 | 11/2007 |
| WO | WO-2008/037642 A1 | 4/2008 |
| WO | WO-2009/128016 A1 | 10/2009 |
| WO | WO-2010/055465 A1 | 5/2010 |
| WO | WO-2010/084475 A2 | 7/2010 |
| WO | WO-2010/115970 A1 | 10/2010 |
| WO | WO-2010/116284 A2 | 10/2010 |
| WO | WO-2010/128844 A1 | 11/2010 |
| WO | WO-2010/137952 A1 | 12/2010 |
| WO | WO-2011/000005 A1 | 1/2011 |
| WO | WO-2011/010263 A1 | 1/2011 |
| WO | WO-2011/113854 A2 | 9/2011 |
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | WO-2013/046014 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A1 | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | WO-2013/144838 A1 | 10/2013 |
| WO | WO-2013/153169 A2 | 10/2013 |
| WO | WO-2013/157924 A1 | 10/2013 |
| WO | WO-2013/157927 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |
| WO | WO-2014/067507 A2 | 5/2014 |
| WO | WO-2014/072942 A2 | 5/2014 |
| WO | WO-2014/076041 A1 | 5/2014 |
| WO | 2014118743 | 8/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |

(56) References Cited

FOREIGN PATENT DOCUMENTS

| WO | WO-2015/075584 A1 | 5/2015 |
|---|---|---|
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | 2015158838 | 10/2015 |
| WO | WO-2015/180960 A1 | 12/2015 |
| WO | WO-2016/041596 A1 | 3/2016 |
| WO | WO-2016/186488 A1 | 11/2016 |
| WO | WO-2016/186489 A1 | 11/2016 |
| WO | WO-2016/186491 A1 | 11/2016 |
| WO | WO-2016/186492 A1 | 11/2016 |
| WO | WO-2016/186496 A1 | 11/2016 |

OTHER PUBLICATIONS

U.S. Appl. No. 15/811,525, filed Nov. 13, 2017.
U.S. Appl. No. 15/811,528, filed Nov. 13, 2017.
U.S. Appl. No. 15/813,049, filed Nov. 14, 2017.
U.S. Appl. No. 15/813,054, filed Nov. 14, 2017.
International Search Report and Written Opinion, PCT/NL2016/050341, Koninklijke Douwe Egberts B.V., 13 pages (dated Oct. 27, 2016).
International Search Report and Written Opinion, PCT/NL2016/050342, Koninklijke Douwe Egberts B.V., 13 pages (dated Nov. 8, 2016).
International Search Report and Written Opinion, PCT/NL2016/050344, Koninklijke Douwe Egberts B.V., 13 pages (dated Oct. 27, 2016).
International Search Report and Written Opinion, PCT/NL2016/050346, Koninklijke Douwe Egberts B.V., 12 pages (dated Nov. 10, 2016).
International Search Report and Written Opinion, PCT/NL2016/050350, Koninklijke Douwe Egberts B.V., 13 pages (dated Nov. 2, 2016).
International Search Report and Written Opinion, PCT/NL2016/050749, Koninklijke Douwe Egberts B.V., 10 pages (dated Feb. 22, 2017).
Consolidated list of cited oppostioin documents dated Jan. 26, 2021; European Application No. 16810087.3 (2 pgs.).
Communication of a notice of opposition dated Jan. 29, 2021; European Application No. 16810087.3 (27 pgs.).
Reply of the patent proprietor to the notice of opposition and annexes, dated Jun. 15, 2021; European Application No. 16810087.3 (137 pgs.).
Summons to attend oral proceedings and preliminary opinion of the opposition division, dated Dec. 9, 2021; European Application No. 16810087.3 (8 pgs.).
Letter from the Opponent, dated Oct. 14, 2022; European Application No. 16810087.3 (12 pgs.).
Consolidated list of cited opposition documents, dated Oct. 14, 2022; European Application No. 16810087.3 (1 pg.).
Decision rejecting the opposition, dated Jan. 12, 2023; European Application No. 16810087.3 (12 pgs.).

* cited by examiner

CAPSULE, SYSTEM AND METHOD FOR PREPARING A BEVERAGE

CROSS-REFERENCE TO RELATED APPLICATIONS

This application is a continuation of International Application No. PCT/NL2016/050749 filed Oct. 27, 2016, which claims priority to International Application No. PCT/NL2015/000036 filed on Oct. 27, 2015 and to International Application No. PCT/2015/050752 filed on Oct. 28, 2015, the entire contents of all of which are hereby incorporated herein by reference.

BACKGROUND

The invention relates to a capsule. Such a capsule is known from European patent application 0 468 079.

In practice, such capsules are mostly arranged and used for extracting coffee, by pressing an injection fluid such as hot water under pressure through powder obtained by grinding roasted coffee beans. However, the substance, which may be in the form of for instance granules, chips or flakes, may also be constituted by or contain constituents that are to be dissolved and/or entrained, such as sugar or milk powder. Substances to be extracted may also be of other types than coffee, such a tea or herbs.

Widely used in the market are capsules of which the capsule body is of aluminum or plastic and of which the open end is sealed-off by a thin sheet, usually of aluminum. The closed end of the capsule body is typically referred to as the bottom. The coffee machines has a housing in which a major portion of capsule body can be received and a closing member. The housing and/or the closing member is/are movable relative to the other between an operating position in which the flange of the capsule is clamped between the housing and a closing member and a transfer position leaving an opening through which a used capsule can be removed from the housing and a fresh capsule can be positioned in the housing. Piercing elements are provided which in use pierce a bottom portion of the capsule body inside the housing.

When pressurized fluid is fed into the housing, it penetrates the capsule through the holes made by the piercing element, and causes an increase in the internal pressure which causes the cover to be torn, for instance with assistance of piercing members of the closing member. Then, a flow of water is pressed into the substance and brewed beverage exits the capsule and guided to a receptacle of the user outside of the machine. The cover may also be to some extent open prior to injection of the pressurized fluid, for instance if the capsule is packaged in a barrier material for retaining flavors, which barrier material is to be removed prior to use.

The screen serves for keeping the substance away from the opening pierced in the capsule and in particular to prevent substance from being entrained to the outside of the capsule when the piercing elements are retracted out of the capsule, to avoid soiling of the housing. In this regard, the screen can also be regarded as a filter counteracting substance counter flow.

The screen may also affect the distribution of the flow of water through the substance and in particular its uniformity over all of the substance and for the entire duration of the beverage making stage. Also, the degree of compression of the substance and formation of foam ("crema") appears to be affected by the screen.

While properties affecting cleanliness of the coffee machine and organoleptic and visual quality of the beverage are important, manufacturing costs and suitability for recycling of materials used are also important for a packaging product such as capsules, which are manufactured in large numbers.

Over the course of time, many solutions have been proposed for the screen or filter for retaining the substance in the capsule after it has been opened. For instance in European patent application 0 468 079, an annular heating system is used for welding the screen in place to a shoulder of a lower face, the screen being detached from the lower face.

European patent application 1 165 398 discloses a screen that can be pierced or is provided with an opening through which the piercing element can pass and be retracted.

European patent application 1 190 959 discloses a screen in the form of a fabric sheet that is sealed to the bottom of the cup over two zones, on the one hand a central part and on the other hand along the periphery of the bottom, allowing the piercing elements to enter in a spacing left between the capsule bottom and the screen between the central and peripheral sealed zones.

European patent application 2 516 296 discloses a screen in the form of a filter element of non-woven material produced from fine plastic fibers, the screen being attached via a dust proof sealing along the periphery of the screen.

WO2015/087180 discloses arranging the screen in the form of a filter element between the substance and the capsule bottom without attachment of the screen to the capsule, so that it is free to move away from the bottom except for the resistance applied by the powdered food substance.

SUMMARY

It is an object of the present invention to provide a capsule with little propensity of soiling the coffee machine, which can be manufactured in a simple manner at low costs and supports processing of the substance into a beverage of high organoleptic and visual quality.

According to the invention, this object is achieved by providing a capsule according to claim 1.

The circumferentially distributed attachment zones provide support keeping a peripheral portion of the screen in position in the capsule, yet interfere relatively little with liquid flow through the screen, so that a relatively large portion of the screen up to its peripheral edge is available for liquid to pass through. Moreover, attaching the screen along circumferentially spaced attachment zones requires relatively little energy and pressure yet reliably ensures that a screen is positioned into each cup, that all off the substance is covered by the screen and that no significant amount of substance enters between the screen during filling. The screen is preferably not attached to a center area of the bottom. The screen may be attached to the capsule only at the attachment zones spaced from the center and circumferentially spaced from each other. The screen may be arranged to move away from the center area of the bottom under influence of piercing elements by means of which, in use, openings are pierced in the bottom of the capsule for injecting fluid into the capsule and/or under influence of fluid injected via openings in the bottom which openings are created by means of a coffee machine wherein the capsule is positioned for brewing coffee.

It has been observed that, when comparing a capsule according to the invention with a prior art capsule wherein the screen is completely sealed along its peripheral edge to the bottom of the capsule and wherein the open end of the capsule is closed by means of an aluminum lid only, the height of an obtained crema layer obtained with the capsule according to the invention is higher than the height of the crema layer obtained with the prior art capsule. Without being bound by theory this may be caused by the screen being moved away from the central part of the bottom under influence of injection fluid or piercing elements and/or by means of injection fluid which may also partially bypass the screen by flowing along areas laying between the attachment zones on the one hand and between the screen and the bottom of the capsule on the other hand.

The invention may also be embodied in a capsule comprising: a capsule body having a bottom, a side wall, an end opposite of the bottom and a flange extending outwardly from the side wall and around the open end; and a cover attached to the outwardly extending flange, the cover closing off the end of the capsule body opposite of the bottom; wherein the capsule body and the cover bounding a capsule chamber, the capsule chamber containing: a substance constituted by a mass of loose, solid particles, for the preparation of a potable beverage by extracting and/or dissolving the substance by means of supplying a fluid under pressure into the capsule, and a screen, permeable to water and impermeable to a predominant portion of said particles, said screen being positioned between said substance and said bottom, said screen having a center; wherein said screen is attached to said capsule body along attachment zones spaced from the center and circumferentially spaced from each other.

The invention may also be embodied in a system comprising such a capsule and a coffee machine, wherein the coffee machine comprises: a housing in which a major portion of capsule body can be received; a closing member with passages for allowing a prepared beverage to flow away from the capsule, the housing and/or the closing member being movable relative to the other between an operating position in which the flange of the capsule is clamped between the housing and the closing member and a transfer position leaving an opening through which a used capsule can be removed from the housing and a fresh capsule can be positioned in the housing; and piercing elements which are arranged for, in use, piercing a bottom portion of the capsule body inside the housing in at least one piercing location; wherein the attachment zones are located peripherally of the at least one piercing location only.

The invention may also be embodied in a method for brewing or preparing a beverage using such a capsule, wherein the method comprises: positioning the capsule in a housing and clamped between the housing and a closing member with perforations for allowing brewed beverage outputted through the cover to flow away from the capsule; piercing a bottom portion of the capsule body inside the housing; feeding pressurized injection fluid such as hot water into the housing, causing the injection fluid to penetrate the capsule through at least one hole pierced therein; causing the cover to be torn preferably under the influence of fluid pressure in the capsule; pressing a flow of injection fluid at least partially through and/or bypassing the screen, into and through the substance and through the cover so that a brewed beverage exits the capsule; and guiding the brewed beverage to a receptacle.

The invention may also be embodied in a method for attaching a screen to a capsule body of such a capsule, wherein the method comprises: providing a capsule comprising a capsule body having a bottom, a side wall, an end opposite of the bottom and a flange extending outwardly from the side wall and around the open end; providing a screen, permeable to water and impermeable to a predominant portion of particles for the preparation of a potable beverage by extracting and/or dissolving the substance by means of supplying a fluid under pressure into the capsule; positioning said screen in said capsule body against said bottom, said screen having a center; and attaching said screen to said capsule body along attachment zones spaced from the center and circumferentially spaced from each other.

Particular elaborations and embodiments of the invention are set forth in the dependent claims.

Further features, effects and details of the invention appear from the detailed description and the drawings.

DETAILED DESCRIPTION

Figure 1:
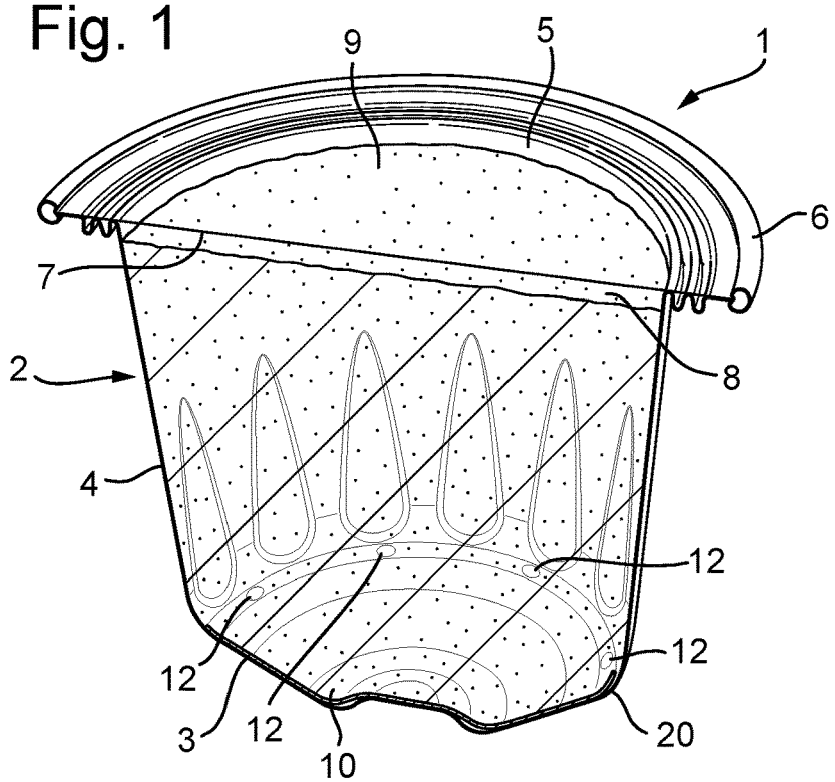
FIG. 1 is a perspective cross-sectional view of a first example of a capsule according to the invention.
Figure 2:
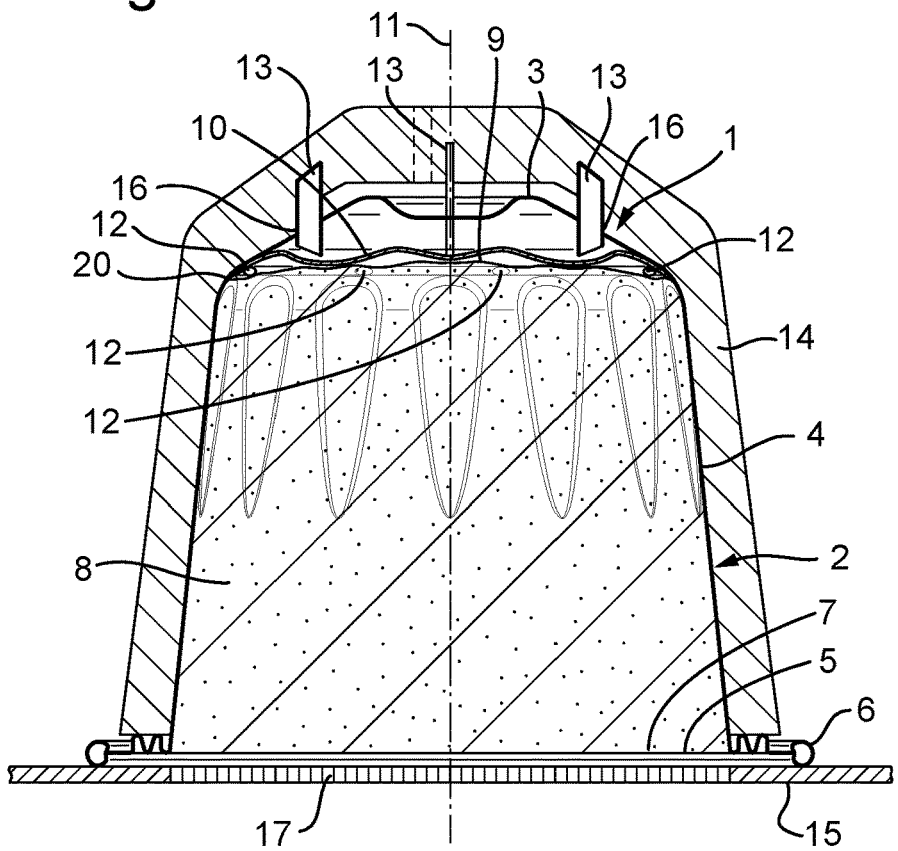
FIG. 2 is a schematic cross-sectional side view of the capsule according to FIG. 1 positioned between a housing and a closing member of a coffee making machine.

In FIGS. 1 and 2 a first example of a capsule 1 according to the invention is shown. The capsule 1 has a capsule body 2 having a bottom 3, a side wall 4, an end 5 opposite of the bottom 3 and a flange 6 extending outwardly from the side wall 4 and around the open end 5. A cover 7 of the capsule is attached to the outwardly extending flange 6 and hermetically closes off the end 5 of the capsule body 5 opposite of the bottom 3. For illustrative purposes, the cover 7 is shown as a transparent member. The cover may also be open to some extent, for instance in an embodiment in which the capsule is packaged in a flavor retaining barrier that is to be removed prior to use and in which the cover does not have to be opened further to allow the brewed beverage to flow through.

The capsule body 2 and the cover 7 bound a capsule chamber 8. The capsule chamber 8 contains a substance 9 constituted by a mass of loose, solid particles, for the preparation of a potable beverage by extracting and/or dissolving the substance by means of supplying an injection fluid under pressure into the capsule.

In this example and in embodiments of the invention general, the substance can for instance be ground, roasted coffee beans, but may also be another substance from which constituents are to be extracted and/or which is to be dissolved and/or emulsified when pressurized injection liquid such as hot water is passed through, for instance tea, milk powder and/or sugar. The substance may for instance be 5-20 grams, preferably 5-10 grams, more preferably 5-7 grams of roasted and ground coffee.

For compatibility with widely used coffee machines, it is generally preferred that the outer diameter of the outwardly extending flange is approximately 37.1 mm, the diameter of the bottom of the capsule is about 23.3 mm, an inner edge of a curled outer edge of the outwardly extending flange has a radius about the central capsule body axis of at least 32 mm, the curled outer edge of the outwardly extending flange has a largest dimension of about 1.2 mm, the inner diameter of the free end of the side wall of the capsule body is about 29.5 mm, the distance between the free end of the side wall of the capsule body and an outermost edge of the outwardly extending flange is about 3.8 mm, a height of the capsule body is about 28.4 mm, the capsule body is truncated, wherein preferably the side wall of the capsule body encloses an angle with a line transverse to the central capsule body axis of about 97.5°, the bottom of the capsule body has a largest inner diameter of about 23.3 mm, the bottom of the capsule body is truncated, preferably having a bottom height of about 4.0 mm and wherein the bottom further has a generally flat central portion opposite the cover having a diameter of about 8.3 mm, the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm. The wall thickness of the cover (preferably made of aluminum) is preferably smaller than the wall thickness of the capsule body, which may for instance be of aluminum or plastic material, such that the cover can be caused to open with assistance of a pressure applied to the capsule chamber, for instance by causing the aluminum cover to tear open on a closing member of the beverage preparation device, such as an extraction plate of the beverage preparation device, under the influence of fluid pressure in the capsule.

Also in the capsule chamber 8, a screen 10, permeable to water and impermeable to a predominant portion of the particles of the substance 9 is arranged. The screen 10 is positioned between the substance 9 and the bottom 3 of the capsule and has a center approximately coaxial with a center line 11 of the capsule 1. The screen 10 is attached to the capsule body 1 along attachment zones 12 spaced from the center 11 and circumferentially spaced from each other.

The circumferentially distributed attachment zones 12 keep a peripheral portion of the screen 10 in position in the capsule 1, yet interfere relatively little with liquid flow through the screen 10, so that a relatively large portion of the screen 10 up to its peripheral edge is available for liquid to pass through. Moreover, attaching the screen 10 along circumferentially spaced attachment zones 12 requires relatively little energy and pressure yet reliably ensures that a screen 10 is positioned into each cup, that all off the substance is covered by the screen 10 and that no significant amount of substance enters between the screen and the bottom 3 during filling. Because during brewing substance tends to be flushed away, also from peripheral portions of the screen 10, entrance of substance between the bottom and the screen 10 after brewing is sufficiently counteracted to prevent substance from reaching the outside of the capsule 10 and soiling the brewing apparatus. Also, the screen reliably keeps the piercing elements 13 (FIG. 2) separated from the substance, since a portion of the screen 10 centrally of the attachment zones 12 is left free to move away from the bottom 3 when the piercing elements 13 enter the capsule chamber 8 through perforation pierced thereby in the bottom 3 of the capsule body 2.

For leaving a large peripheral portion of the screen 10 free for the liquid to pass through, spacings in circumferential sense between successive attachment zones 12 preferably leave open at least 30% or, in order of increasing preference, 40%, 50%, 60% or 70% of a circumferential zone in which the attachment zones 12 are located.

To allow the screen 10 to be displaced by the piercing elements easily, without being pierced thereby, the screen 10 is preferably made of flexible material, such as paper, plastic film, or fiber material in the form of a woven, non-woven or knitted structure. Good brewing results at low costs can be achieved if the screen 10 is of filter paper. If the filter paper contains thermoplastic constituents such as fibers and/or binder material, these can be used for sealing to the capsule body in the attachment zones, as will be described in more detail.

For allowing the screen 10 to be displaced by the piercing elements 13 easily, it is also advantageous if all the attachment zones are distributed along a periphery of the screen element.

In FIG. 2 also relevant parts of a coffee machine, which, together with the capsule 1, form a beverage brewing system, are shown. These parts include a housing 14 in which a major portion of capsule body 2 can be received and a closing member 15 with passages 17 for allowing a prepared beverage to flow away from the capsule 1. The housing 14 and/or the closing member 15 is/are movable relative to the other between an operating position in which the flange 6 of the capsule 1 is clamped between the housing 14 and the closing member 15 and a transfer position leaving an opening through which a used capsule 1 can be removed from the housing 14 and a fresh capsule 1 can be positioned in the housing 14. The piercing elements 13 which are arranged for, in use, piercing a bottom portion 3 of the capsule body 2 inside the housing 14 in several piercing locations 16 (in principle a single piercing element for piercing in a single location would be possible as well; in this example three piercing elements are provided which lay on a circle such that each of the piercing elements pierces the capsule just outside a central part of the bottom). Such coffee machines are commercially available and therefore not described in more detail.

In the system according to the invention, the attachment zones 12 are located peripherally of the piercing location or piercing locations 16 only. Thus, it is ensured that the piercing elements contact the screen 10 in an area surrounded by and located centrally relative to the attachment zones 12, so that the screen 10 can on the one hand move along with the tips of the piercing elements 13 contacting the screen 10 while on the other hand being retained in place in several positions surrounding the piercing elements 13, so that substance 9 is reliably prevented from reaching piercing locations 16, by circumventing the screen 10 or by being entrained with a piercing element 13 as it is retracted.

For this purpose, it is moreover preferred that the attachment zones 13 are all arranged at a distance from the center 11 of more than 60% or, more preferably, more than 70% of the radial size of the screen 10 in a direction from the center 11 to the respective attachment zone 13. Also for this purpose, and for ease of manufacturing, it is preferred that the number of attachment zones 12 is less than 25 and, more preferably, less than 20 or 15. Thus the screen is attached to the capsule only at the attachment zones which are spaced from the center and circumferentially spaced from each other. The screen is not attached to a center area of the bottom. The screen is arranged to move away from the center area of the bottom under influence of fluid injected via openings in the bottom which openings are created by means of an apparatus wherein the capsule is positioned for brewing coffee and/or under influence of piercing elements by means of which, in use, openings are pierced in the bottom of the capsule for injecting fluid into the capsule. It has been observed that the capsule provides a higher crema layer than conventional capsules wherein the screen is attached to the capsule at the central part of the bottom and wherein the screen is attached along its peripheral edge to the bottom of the capsule. Without being bound by theory this may be caused by the screen being moved away from the central part of the bottom under influence of injection fluid or piercing elements and/or by means of injection fluid which may also partially bypass the screen by flowing along areas laying between the attachment zones on the one hand and between the screen and the bottom of the capsule on the other hand.

For allowing the screen 10 to easily be displaced by a tip of a piercing element 13 without being pierced, it is moreover advantageous if the screen 10 has a generally frustoconical shape and enough headroom is left above the substance 9 in a capsule 1 to allow the screen 10 to be displaced away from the bottom 3 over the maximum distance over which the piercing elements 13 project into the capsule chamber 8. For sufficient deformability, preferably the bottom 3 has a generally frustoconical portion in contact with the frustoconical shape of the screen 10 prior to piercing of the bottom 3.

A particularly reliable fixation along the periphery of the screen 10 can be achieved if, as in the present example, the attachment zones 12 are located directly adjacent a transition 20 from the bottom 3 to the side wall 4. For reliable fixation, it is moreover preferred that the number of attachment zones is at least three and, more preferably, at least four, five or six.

Figure 3:
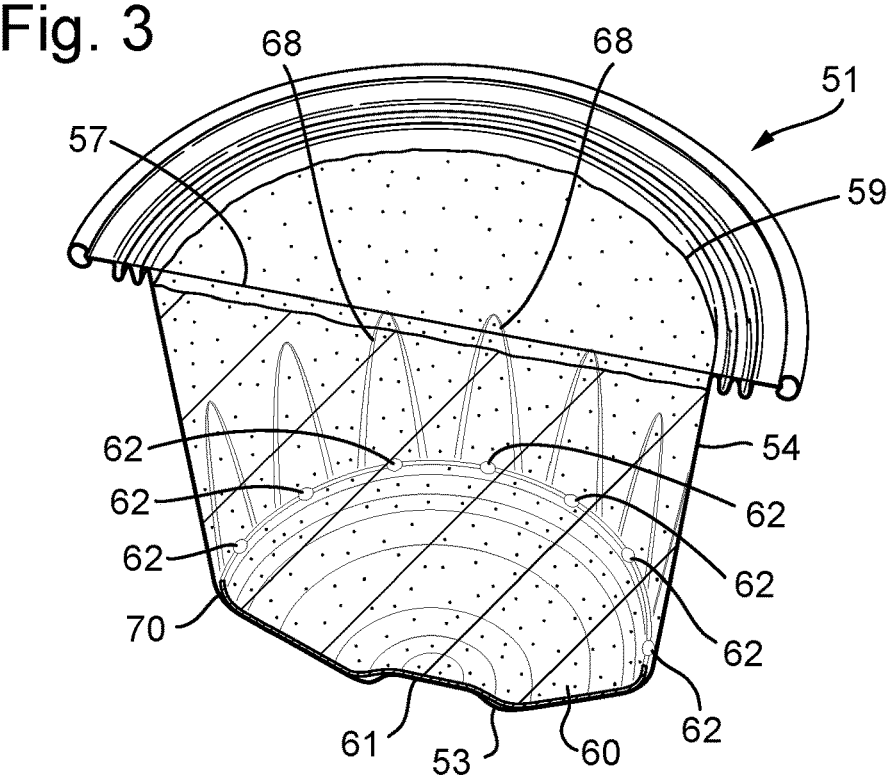
FIG. 3 is a perspective cross-sectional view of a second example of a capsule according to the invention.
Figure 4:
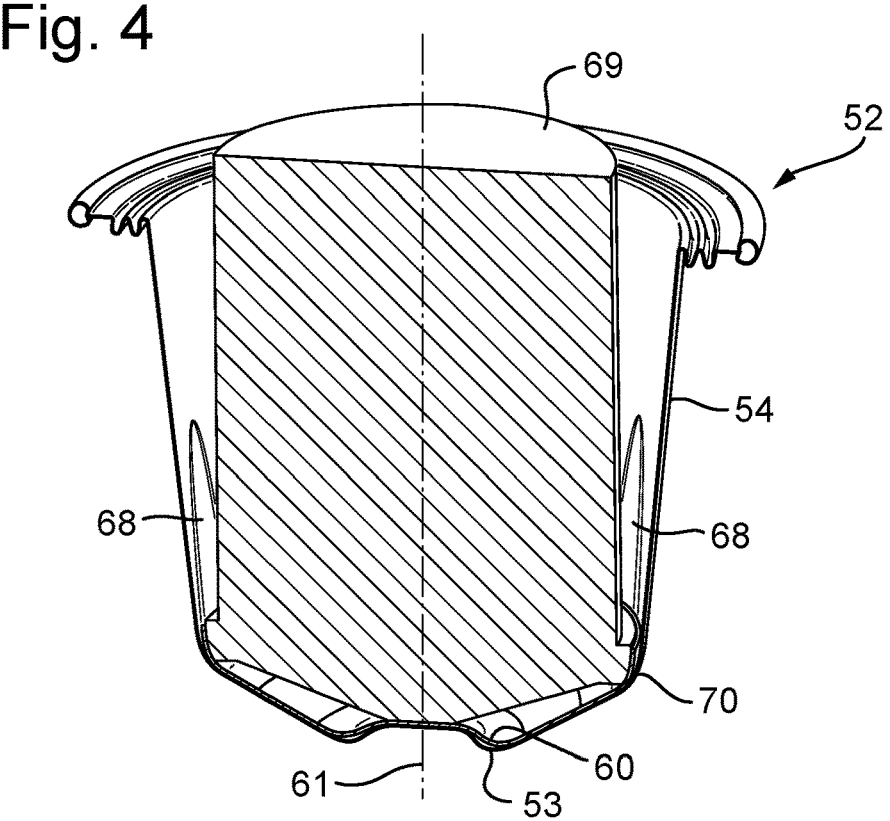
FIG. 4 is a perspective cut-away view of a capsule body of the capsule according to FIG. 3, with an example of a sealing tool.

In FIGS. 3 and 4 a second example of a capsule 51 according to the invention and, respectively a capsule body 52 of that capsule 51 are shown. In principle, only features of this capsule 51 that differ significantly from the capsule 1 shown in FIGS. 1 and 2 are described. For illustrative purposes, the cover 57 in FIG. 3 is shown as a transparent member.

In this capsule 51, the attachment zones 62 are at least partially located in a transition 70 from the bottom 53 to the side wall 54. This allows the screen 60 to be attached further from the center 61 of the capsule 51. In the present example, this is taken to an extreme by arranging the attachment zones 62 in end portions near the bottom 53 of flutes 68 bulging outwardly of the general conical shape of the sidewall 54.

In FIG. 4, a sealing tool 69 of which a lower tip area may be heated, for instance to 160-200° C., is shown. By pressing the heated tool 69 into a capsule body 52 into which a screen 60 has been positioned, the screen can be sealed to the capsule body 52. The melting adhesive may have been applied to the screen 60 or to the capsule body 52 or to both.

The need of applying an adhesive to the screen can be avoided by providing that the screen is of hot sealable thermoplastic material or contains such material. Preferably, the screen is of a filter paper containing a blend of fiber materials comprising cellulose fibers and thermoplastic fibers, preferably of polyolefin material. When pressing such filter paper against the capsule and heating the filter paper in the compressed area, the plastic material is molten, adheres to the capsule body and constitutes a matrix material in which the cellulose fibers are embedded in the attachment zones. For an effective adhesion it is advantageous that by compressing only locally in the attachment zones, a relatively high pressure can be exerted at a given pressure force, so that cellulose fibers are firmly embedded even if the relative contents of thermoplastic material is relatively low and the thermoplastic material is reliably pressed against the capsule body over large proportion of the attachment zones.

For reliable attachment, it is preferred that at least 15% of the fiber material of the paper is of thermoplastic and preferably polyolefin material. For a particularly good adhesion, it is preferred that the polyolefin material is polypropylene or contains at least 50% polypropylene.

Also for a reliable attachment, it is advantageous if the interior surface of the capsule body has a plastic coating. The coating may be provided only in a zone in which the attachment zones will be located or constitute a lining of the entire interior surface of the capsule. The plastic coating is preferably of PVC or PVC based material.

However, in this and other embodiments, depending on the materials used, other fixation techniques may be used as well, such as high frequency welding, ultrasound welding, non-thermal adhesion or mechanical attachment.

In this example, substance 59 is refrained from reaching perforations pierced in the bottom 53 particularly effectively, because a peripheral portion of the screen 60 covers a transition 70 from the bottom 53 to the side wall 54.

Figure 5:
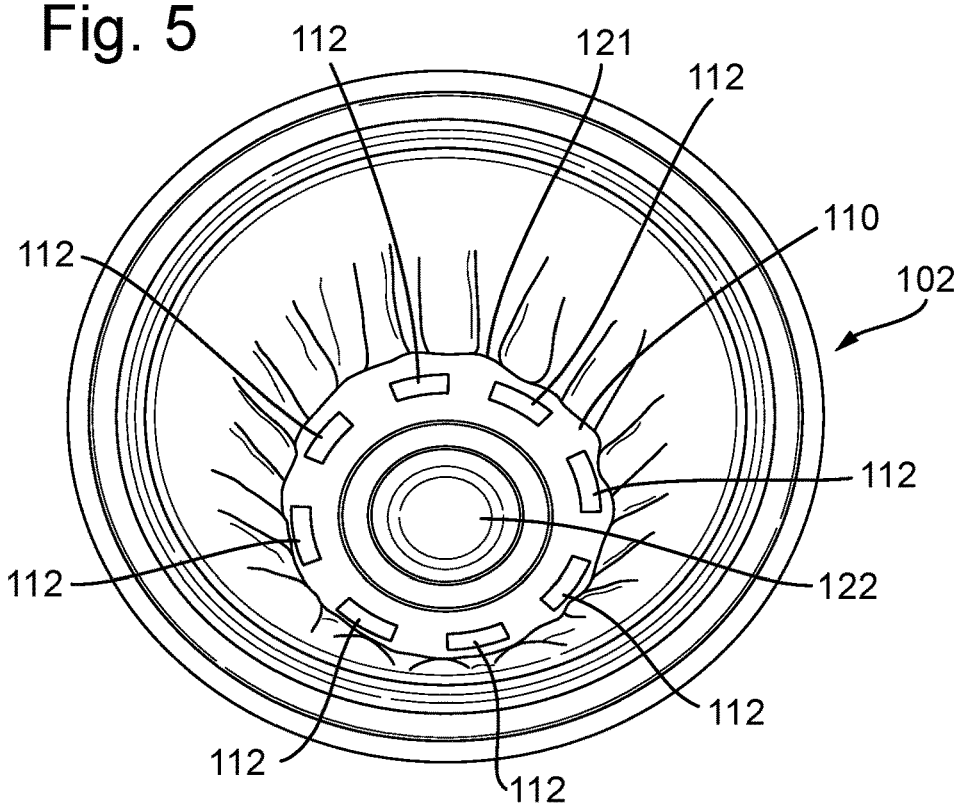
FIG. 5 is a perspective view of a capsule body with a screen of a third example of a capsule according to the invention.
Figure 6:
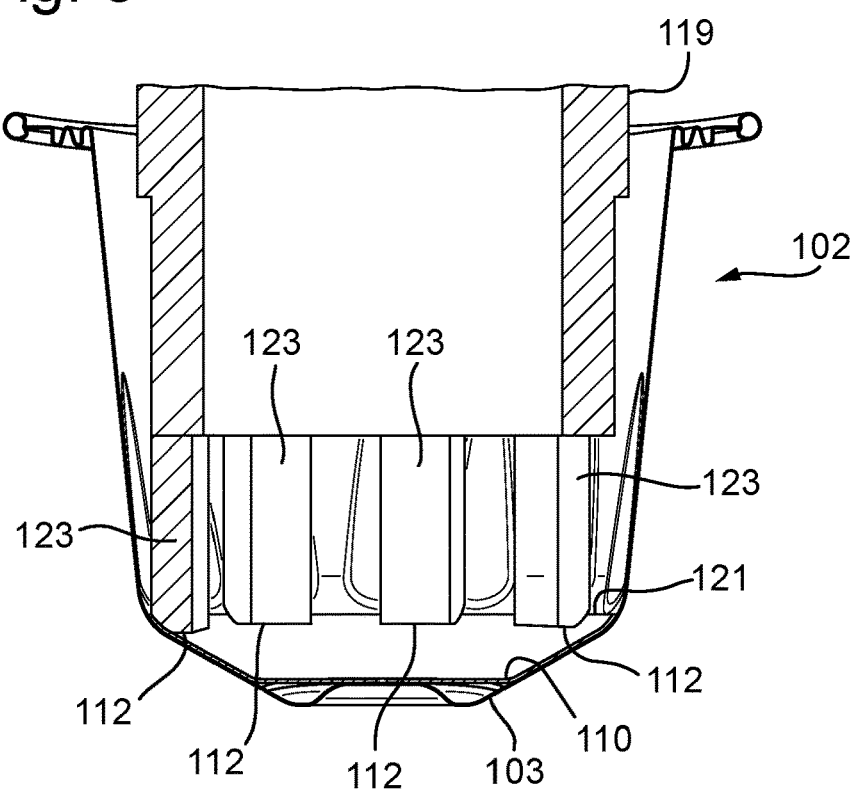
FIG. 6 is a schematic cross-sectional side view of the capsule body shown in FIG. 5 with an example of a sealing tool.

In FIGS. 5 and 6, a capsule body 102 with a screen 110 of a third example of a capsule according to the invention is shown. In principle, only features of this capsule that differ significantly from the capsules 1 and 51 shown in FIGS. 1-4 are described. In this example, the attachment zones 112 are elongated in circumferential sense. This allows a particularly effective fixation and leaves relatively little space for solid material of the substance to migrate between the bottom and the screen towards perforations that have been pierced in the bottom 103. This allows the attachment zones 112 to be located in a peripheral zone of the screen 110 that is slightly more inward from its peripheral edge 121, but still well clear from a central zone 122 where piercing elements contact the screen after having pierced through the bottom 103 of the capsule body 102. For this purpose, the spacings in circumferential sense between successive attachment zones 112 preferably leave open at most 70% and, more preferably, at most 60% or 50%, of a circumferential zone in which the attachment zones 112 are located.

Figure 7:
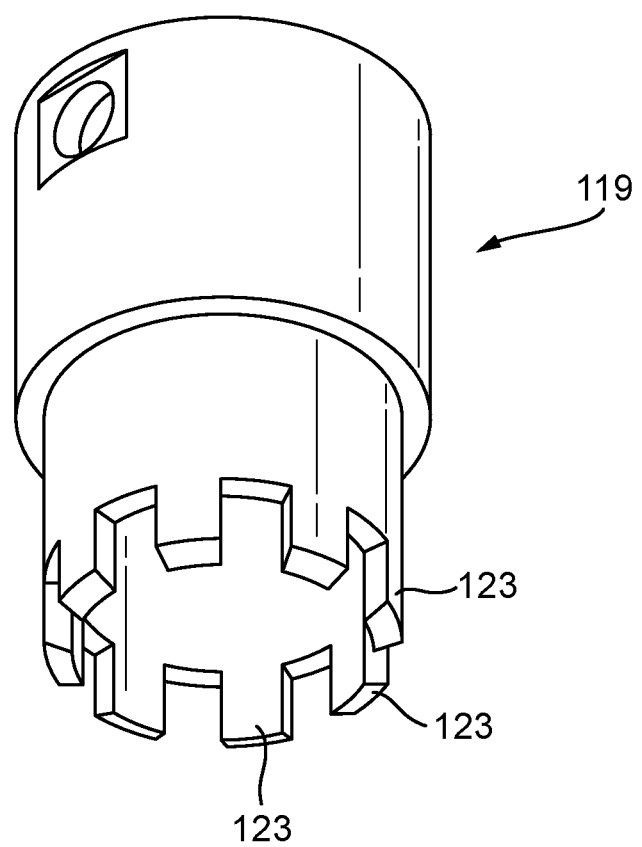
FIG. 7 is a perspective view of the sealing tool shown in FIG. 6.

In FIGS. 6 and 7, a sealing tool 119 of which a lower tip area may be heated, for instance to 160-200° C., is shown. By pressing the heated sealing tool 119 into a capsule body 102 into which a screen 110 has been positioned, the screen can be sealed to the capsule body 102, the attachment zones being formed at the free ends of distally projecting legs 123 of the sealing tool 119. Because the sealing tool has to be pressed against the capsule body in the attachment zones only, relatively little pressure is sufficient to ensure effective sealing. Apart from allowing lighter production machinery, this reduces the risk of deforming the capsule. Furthermore, because the sealing tool is heated in the attachment zones only, energy consumption for production is reduced and the attachments made cool of more quickly than in a situation in which the attachments extend over the full circumference, so that a shorter cycle time can be achieved.

Several features have been described as part of the same or separate embodiments. However, it will be appreciated that the scope of the invention also includes embodiments having combinations of all or some of these features other than the specific combinations of features embodied in the examples.

The invention claimed is:

1. A capsule comprising:
    a capsule body having a bottom, a side wall, an end opposite of the bottom and a flange extending outwardly from the side wall and around the open end; and
    a cover attached to the outwardly extending flange, the cover closing off the end of the capsule body opposite of the bottom;
    the capsule body and the cover bounding a capsule chamber, the capsule chamber containing:
    a substance constituted by a mass of loose, solid particles, for the preparation of a potable beverage by extracting and/or dissolving the substance by means of supplying a fluid under pressure into the capsule, and
    a screen, permeable to water and impermeable to a predominant portion of said particles, said screen being positioned between said substance and said bottom, said screen having a centre; wherein the screen is arranged to move away from the centre area of the bottom under influence of piercing elements by means of which, in use, openings are pierced in the bottom of the capsule for injecting fluid into the capsule and/or under influence of fluid injected via openings in the bottom which openings are created by means of a coffee machine wherein the capsule is positioned for brewing coffee, and
    wherein said screen is attached to said capsule body along attachment zones spaced from the centre and circumferentially spaced from each other.

2. The capsule according to claim 1, wherein all the attachment zones are distributed along a periphery of the screen.

3. The capsule according to claim 2, wherein all the attachment zones are arranged at a distance from the centre of more than 60% of the radial size of the screen in a direction from the centre to the respective attachment zone.

4. The capsule according to claim 1, wherein the attachment zones are located directly adjacent a transition from the bottom to the side wall.

5. The capsule according to claim 1, wherein the attachment zones are at least partially located in a transition from the bottom to the side wall.

6. The capsule according to claim 1, wherein a peripheral portion of the screen covers a transition from the bottom to the side wall.

7. The capsule according to claim 1, wherein the screen has a frustoconical shape.

8. The capsule according to claim 7, wherein the bottom has a frustoconical portion in contact with the frustoconical shape of the screen.

9. The capsule according to claim 1, wherein the attachment zones are elongated in a circumferential sense.

10. The capsule according to claim 1, wherein spacings in circumferential sense between successive attachment zones leave open at least 30% of a circumferential zone in which the attachment zones are located.

11. The capsule according to claim 1, wherein spacings in circumferential sense between successive attachment zones leave open at most 70% of a circumferential zone in which the attachment zones are located.

12. The capsule according to claim 1, wherein the attachment zones are evenly distributed along a periphery of the screen.

13. The capsule according to claim 1, wherein the screen is of flexible material, so as to be deformable by piercing elements without being pierced.

14. The capsule according to claim 13, wherein the screen is of filter paper.

15. The capsule according to claim 14, wherein the filter paper contains a blend of fibre materials comprising cellulose fibres and thermoplastic fibres.

16. The capsule according to claim 15, wherein the thermoplastic fibres comprise fibres of polyolefin material.

17. The capsule according to claim 1, wherein an interior surface of the capsule body has a plastic coating, at least in the attachment zones.

18. The capsule according to claim 17, wherein the plastic coating is of PVC or PVC based material or a PVC based sealing lacquer.

19. The capsule according to claim 1, wherein the number of attachment zones is three or more.

20. The capsule according to claim 1, wherein the number of attachment zones is less than 25.

21. The capsule according to claim 1, wherein all of the attachment zones where the screen is attached to the capsule are spaced from the centre and circumferentially spaced from each other.

22. The capsule according to claim 1, wherein the screen is not attached to a centre area of the bottom.

23. A capsule and a coffee machine, the capsule being a capsule according to claim 1, the coffee machine comprising:
    a housing in which a major portion of capsule body can be received;
    a closing member with passages for allowing a prepared beverage to flow away from the capsule, the housing and/or the closing member being movable relative to the other between an operating position in which the flange of the capsule is clamped between the housing and the closing member and a transfer position leaving an opening through which a used capsule can be removed from the housing and a fresh capsule can be positioned in the housing; and
    piercing elements which are arranged for, in use, piercing a bottom portion of the capsule body inside the housing in at least one piercing location;
    wherein the attachment zones are located peripherally of the at least one piercing location only.

* * * * *